United States Patent [19]

Lang et al.

[11] Patent Number: 5,091,241
[45] Date of Patent: Feb. 25, 1992

[54] FILM LAMINATE WITH EASY TO TEAR

[76] Inventors: Theodore J. Lang, 656 Sussex Blvd., Kingston, Ontario, Canada, K7M 5A8; Kevin Bergevin, 146 Falkirk Terr., Kingston, Ontario, Canada, K7M 4C2

[21] Appl. No.: 445,774

[22] Filed: Dec. 4, 1989

[30] Foreign Application Priority Data

Dec. 5, 1988 [GB] United Kingdom ............ 8828349

[51] Int. Cl.⁵ .................................... B32B 27/08
[52] U.S. Cl. .................................... 428/213; 428/347; 428/349; 428/461; 428/516; 428/518; 428/520
[58] Field of Search .......... 428/516, 347, 213, 349, 428/461, 518, 520

[56] References Cited

U.S. PATENT DOCUMENTS

| | | | |
|---|---|---|---|
| 4,160,053 | 7/1979 | Clayton | 428/516 |
| 4,228,215 | 10/1980 | Aein et al. | 428/516 |
| 4,389,450 | 6/1983 | Schaefer et al. | 428/347 |
| 4,399,180 | 8/1983 | Briggs et al. | 428/516 |
| 4,551,380 | 11/1985 | Schoenberg | 428/516 |
| 4,590,124 | 5/1986 | Schoenberg | 428/516 |
| 4,692,386 | 9/1987 | Schinkel et al. | 428/516 |
| 4,923,750 | 5/1990 | Jones | 428/516 |
| 4,944,409 | 7/1990 | Busche et al. | 428/516 |

FOREIGN PATENT DOCUMENTS

| | | |
|---|---|---|
| 460963 | 11/1949 | Canada . |
| 764942 | 8/1967 | Canada . |
| 856137 | 11/1970 | Canada . |
| 893216 | 2/1972 | Canada . |
| 61-167550 | 7/1986 | Japan . |

Primary Examiner—James J. Seidleck
Attorney, Agent, or Firm—David M. Shold

[57] ABSTRACT

A transversely tearable film and pouches made therefrom are disclosed. The transversely tearable laminate comprises a machine direction oriented linear low density polyethylene film adhesively laminated on at least one side to a sealant film, the sealant film having an .Elmendorf tear in the machine direction of at least about 2 g/μm, and the selection of said oriented film and said sealent film being made on the basis that:

$$K.X > (1-Y),$$

wherein
K is an empirically determined factor which depends of the properties of the oriented film and the sealant film,
X is the thickness of all layers of sealant film in micrometers, $$Y = (MD_c)/(TD_c)$$

$MD_c$ is the Elmendorf tear strength, in the machine direction, of the oriented film, measured in grams, and
$TD_c$ is the Elmendorf tear strength, in the transverse direction, of the oriented film, measured in grams.

9 Claims, 3 Drawing Sheets

FILM LAMINATE WITH EASY TO TEAR

The invention relates to film laminates suitable for making pouches filled with flowable materials, e.g. liquids.

It is well known to package flowable materials in pouches or sachets. For example, milk, pie fillings and other comestibles have been packaged on so-called vertical form and fill machines. Using such a machine, a flat web of synthetic thermoplastic film is unwound from a roll and formed into a continuous tube in a tube forming section, by sealing thus longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws, with heat sealing element mounted on one of the jaws. After making the transverse seal, the flowable material is allowed to enter the tube, at the filling station, and fill the tube upwardly from the aforementioned transverse seal. The tube is then allowed to drop, or is fed, a predetermined distance under the influence of the weight of the material in the tube. The jaws of the sealing device are closed again, thus collapsing the tube at a second transverse section. The sealing device seals and severs the tube transversely at the second transverse section. The material-filled portion of the tube is now in the form of a pillow shaped pouch. Thus the sealing device as sealed the top of the filled pouch, sealed the bottom of the next-to-be formed pouch, all in one operation. One such vertical form and fill machine of the type described above is sold under the trade mark PREPAC.

Many sachets are made from two webs of synthetic thermoplastic film. The two webs are brought into face to face contact with the longitudinal edges in register. The longitudinal edges are then heat sealed to form longitudinal fin seals. The two webs are then in tubular form and may be filled and sealed in much the same manner as the pouches described hereinabove. The webs may be made from single ply films, e.g. polyethylene film, or film composites, e.g. polyethylene/paper or polyethylene/ethylene vinyl alcohol copolymer/nylon. The sachets so formed appear to have a front and a back wall, which are sealed around their periphery, i.e. have a circumferential edge seal.

For many years, milk has been packaged in pouches made on vertical form and fill machines. Milk, in pouches has been sold to household consumers and, in use, such milk-filled pouches are stood within an open-mouthed pitcher. Conveniently, an upper corner of the pouch is snipped off with scissors or a partially sheathed blade and the snipped-off corner disposed of. More recently, such pouches have been used to package other flowable comestibles, e.g. mayonnaise, salad dressings, sauces, preserves and the like. Pouches containing such comestibles are usually sold to "institutional" buyers, e.g. restaurants. For such buyers it is preferred to have an "easy-open" feature on the pouches. It is further preferred not to snip off a corner of the pouch because of the possibility of the snipped-off corner contaminating food. Additionally, flowable materials, e.g. mustard, sugar, have been packaged in sachets. In order to open such sachets without the necessity for scissors, knives or the like, many such sachets have a nick or slit in the edge seal which forms an initiation point for tearing open the sachet by hand with ease.

Webs which tear more easily in the transverse direction than in the machine direction are highly desirable for so-called easy-open pouches, or sachets. For many end uses, polyethylene films would be preferred, primarily for cost reasons. However, it appears that most polyethylene films, and laminates or coextrusions consisting essentially of polyethylene have, heretofore, been developed for impact and tear resistance rather than than for ease of tearing in the transverse direction.

Canadian Patent 764 942 to A. A. Ritchie, which issued 1967 August 8 discloses the lamination of two monoaxially oriented thermoplastic films, with the directions of orientation essentially at right angles to one another. Such a laminate is disclosed as having improved resistance to tear. Ethylene/butene copolymer film, stretched 4.5 times in the machine direction, is exemplified.

U.S. Pat. No. 4,228,215, which issued 1980 Oct. 14 to American Can Co. discloses a laminated film comprising a uniaxially oriented base film and a substantially unoriented heat-sealing film. The base film, about 12–63 $\mu$m in thickness, is selected from high density polyethylene, low density ethylene/vinyl acetate copolymer, ethylene/vinyl alcohol copolymer or polyamide resin. The heat-sealing film is produced from copolymer of ethylene/acrylic acid, polyvinylchloride resin or polyvinylidene chloride resin. A curable adhesive of polyurethane-polyester is used for the laminating process. The film has a thickness ratio of heat seal film to base film of 0.5–1.5:1.0 and is biaxially tearable.

U.S. Pat. No. 4,399,180 to W. F. Briggs and E. M. Bullard, which issued 1983 Aug. 16 discloses a laminar thermoplastic film consisting of at least two layers, one of which is a low density polyethylene and the other is a linear low density polyethylene, such layers being bonded throughout their interface. It is indicated that such laminate is suitable for use as a stretch-wrap film, which shows improved resistance to tear in both the machine and transverse directions.

U.S. Pat. No. 4,160,053, which issued 1979 July 3 to W. J. Clayton discloses a laminate suitable for making heavy duty bags, comprising low density polyethylene films blocked together at 80°–100° C. and below the fusion temperature of the polyethylene. The films have a plus-or-minus 15 degrees of orientation. The films have a density of 0.915–0.925 g/cm$^3$, a melt index of 0.2–0.26 dg/min and a thickness of 50–75 $\mu$m. The laminate is indicated as exhibiting greater impact and tear resistance than laminates of similar film formed by a fusion lamination process.

U.S. Pat. No. 4,551,380, which issued 1985 Nov. 5 to J. H. Shoenberg discloses a film comprising a) a crosslinked core layer consisting of a linear low density polyethylene (LLDPE) and b) two crosslinked surface layers, each consisting of a blend of LLDPE, linear medium density polyethylene and ethylene/vinyl acetate copolymer. The film has a high degree of orientation, e.g. draw ratio of 3.0–6.0 in longitudinal and transverse directions. The laminate is indicated as having good puncture and tear resistance.

Japanese Kokai 61(1986)-167550 to Sakai et al., published 1986 July 29, discloses packages made from a composite film of a substrate sheet, e.g. aluminium foil or paper, adhesively bonded to a 10–100 $\mu$m uniaxially oriented polyethylene film having a density of less than 0.94 g/cm$^3$ stretched in the longitudinal or transverse directions from 6 to 20 times. The sealant layer of the composite is the oriented polyethylene film and the easy tear direction is indicated as being in the direction of stretch of the film.

Du Pont Canada Inc. supplies a packaging machine which is adapted to make an easy open pouch wherein adjacent to a transverse end heat seal is situated a small compartment at the corner of the pouch. The small compartment has a tear initiating location, e.g. a slit, therein. The pouch may be made, for example, of a film composite comprising an ethylene/vinyl alcohol copolymer layer, an oriented or unoriented nylon layer, an oriented polypropylene film or an oriented polyester film sandwiched between two sealant layers.

As used hereinafter, and in the claims, the term "pouch" includes the term "sachet".

Surprisingly, it has been found that by combining film layers which, individually, tear more easily in the machine direction, a multi-ply laminate can be formed, and a pouch made therefrom, which tears more easily in the transverse direction.

Accordingly, the present invention provides a transversely tearable laminate comprising a machine direction oriented linear low density polyethylene film adhesively laminated on at least one side to a sealant film, the sealant film having an Elmendorf tear in the machine direction of at least about 2 g/μm, and the selection of said oriented film and said sealant film being made on the basis that:

$$KX > (1-Y),$$

wherein

K is an empirically determined factor which depends on the properties of the oriented film and the sealant film, X is the thickness of all layers of sealant film in micrometers, $$Y = (MD_c)/(TD_c)$$

$MD_c$ is the Elmendorf tear strength, in the machine direction, of the oriented film, measured in grams, and $TD_c$ is the Elmendorf tear strength, in the transverse direction, of the oriented film, measured in grams.

In one embodiment the oriented film is made from a polymer selected from the group consisting of at least one ethylene/$C_4$-$C_{10}$ α-olefin copolymer having a density of from 0.900 to 0.940 g/cm$^3$ and blends of such copolymer with a second polymer, selected from a homopolymer of ethylene and a copolymer of ethylene and vinyl acetate, said second polymer having a density of from 0.910 to 0.940 g/cm$^3$, said blend having up to 70 wt. % of said second polymer.

In another embodiment the oriented film is made from an ethylene/$C_6$-$C_{10}$ α-olefin copolymer, especially an ethylene/$C_6$-$C_8$ α-olefin copolymer.

In a further embodiment the oriented film is made from an ethylene/octene-1 copolymer.

In another embodiment the oriented film has a density of from 0.916 to 0.924 g/cm$^3$.

In another embodiment the oriented film has been oriented in the machine direction at a draw ratio of from 1.5 to 6.5. Especially preferred is a draw ratio of from 4.0 to 5.0.

In a further embodiment the sealant film is made from a polyethylene resin selected from a linear copolymer of ethylene and a $C_6$-$C_{10}$ α-olefin, especially a $C_6$-$C_8$ α-olefin, having a density of from 0.916 to 0.924 g/cm$^3$ and blends of said copolymer with up to about 70 wt. % of another ethylene polymer, i.e. a homopolymer or copolymer, having a density of from 0.915 to 0.925 g/cm$^3$.

In further embodiments the sealant film is made from resin selected from an ethylene/vinyl acetate copolymer, an ethylene/acrylic acid copolymer, an ethylene/methacrylic acid copolymer, an ionomeric polymer and blends thereof with a polyethylene.

In yet another embodiment the sealant film is a blown film.

In another embodiment at least one of the films in the laminate is metallized or coated with a barrier coating. Preferred barrier coatings are selected from polyvinylidene chloride and ethylene/vinyl alcohol copolymer coatings.

The present invention further provides a pouch containing a flowable material, said pouch having transversely sealed ends, having a tear initiation locus adjacent at least one of the transversely sealed ends, said pouch being made with a transversely tearable film laminate, said film laminate comprising a machine direction oriented linear low density polyethylene film laminated on at least one side to a sealant film, the sealant film having an Elmendorf tear in the machine direction of at least about 2 g/μm, and the selection of said oriented film and said sealant film being made on the basis that:

$$KX > (1-Y),$$

wherein

K is an empirically determined factor which depends on the properties of the oriented film and the sealant film, X is the thickness of all layers of sealant film in micrometers, $$Y = (MD_c)/(TD_c)$$

$MD_c$ is the Elmendorf tear strength, in the machine direction, of the oriented film, measured in grams, and $TD_c$ is the Elmendorf tear strength, in the transverse direction, of the oriented film, measured in grams.

In one embodiment the oriented film is made from a polymer selected from the group consisting of at least one ethylene/$C_4$-$C_{10}$ α-olefin copolymer having a density of from 0.900 to 0.940 g/cm$^3$ and blends of such copolymer with a second polymer, selected from a homopolymer of ethylene and a copolymer of ethylene and vinyl acetate, said second polymer having a density of from 0.910 to 0.940 g/cm$^3$, said blend having up to 70 wt. % of said second polymer.

In one embodiment the pouch is made from a single web of film, heat-sealed longitudinally along the longitudinal edges of the web.

In another embodiment the pouch is made from two webs, at least one of which is the transversely tearable laminate.

In a further embodiment the sealant film is a polyethylene resin selected from a linear copolymer of ethylene and a $C_6$-$C_{10}$ α-olefin, especially a $C_6$-$C_8$ α-olefin, having a density of from 0.916 to 0.924 g/cm$^3$ and blends of said copolymer with up to about 70 wt. % of another ethylene polymer, i.e. a homopolymer or copolymer, having a density of from 0.915 to 0.925 g/cm$^3$.

In further embodiments the sealant film is made from resin selected from an ethylene/vinyl acetate copolymer, an ethylene/acrylic acid copolymer, an ethylene/methacrylic acid copolymer, an ionomeric polymer and blends thereof with a polyethylene.

In another embodiment the oriented film has a density of from 0.916 to 0.924 g/cm$^3$.

In a further embodiment the sealant film is a polyethylene resin selected from a linear copolymer of ethylene and a $C_6$–$C_{10}$ α-olefin, especially a $C_6$–$C_8$ α-olefin, having a density of from 0.916 to 0.924 g/cm$^3$ and blends of said copolymer with up to about 70 wt. % of another ethylene polymer, i.e. a homopolymer or copolymer, having a density of from 0.915 to 0.925 g/cm$^3$.

In yet another embodiment the sealant film is a blown film.

In another embodiment at least one of the films in the laminate is metallized or coated with a barrier coating. Preferred barrier coatings are selected from polyvinylidene chloride and ethylene/vinyl alcohol copolymer coatings.

In a further embodiment the tear initiation locus is selected from a slit, a perforation, a nick and a thinning in the laminate and a tear tape applied to the laminate.

In yet another embodiment the pouch has a heat-sealed area at or adjacent to one of the transverse seals at a corner of said pouch, said heat-sealed area joining the so-called front and back walls of said pouch and having a slit or perforation therein extending from the free edge of the heatsealed area.

In yet another embodiment the pouch has a small compartment adjacent one of the transverse heat seals, and separated from the portion of the pouch containing the flowable material by a heat seal which joins the so-called front and back walls of said pouch, said compartment having therein a slit or perforation substantially parallel to said transverse heat seal.

In a further embodiment the pouch is a sachet having both webs of the transversely tearable laminate heat sealed transversely at both ends and at both sides of the sachet, and having a slit, perforation or nick in at least one of the side seals.

Density of the ethylene polymers is determined using ASTM Procedure D 1505-68. Elmendorf tear strength is determined using ASTM Procedure D 1922. Percent elongation at break is determined using ASTM Procedure D-638.

For reasons of economy it is desirable that X, the total thickness of all layers of sealant film, be minimized. When X is minimized, then to satisfy the inequality KX>(1-Y) both K and Y should be maximized.

Y is maximized by choosing an oriented film which has a substantially balanced Elmendorf tear strength. In practice this means that even though the machine direction tear strength $MD_c$ is less than the transverse direction tear strength $TD_c$, Y should be as high as possible. Y is easily calculated once the Elmendorf tear properties of the oriented film have been measured.

K may be maximized in one or both of two ways. The first is by choosing a sealant film which has a substantially balanced Elmendorf tear strength. In practice this means that even though the machine direction tear strength $MD_s$ is less than the transverse direction tear strength $TD_s$, $MD_s/TD_s$ should be as high as possible. The second is to limit the stretchability of the laminate in the machine direction, so that the energy applied to tear the laminate remains well directed at the point of tear, i.e. in the transverse direction. Stretchability may be limited by bonding the oriented film to the sealant film(s) strongly and without substantial weak areas.

K is determined empirically. An oriented film and a type of sealant film are chosen, based upon a number of factors which relate the cost and performance of the laminate and its end use, e.g. its performance in a pouch. A series of laminates are then made from the oriented film and a number of different thicknesses of sealant film, i.e. different values for X. When there is no sealant film present, viz when X=0, the oriented film will tear more easily in the machine direction than in the transverse direction. If the thickness of sealant film(s) is/are increased sufficiently, the laminate will tear more easily and consistently in the transverse direction. The thickness at which there is a change in the tearing property of the laminate, from the machine direction to the transverse direction, $X_t$, may then be used to calculate K, from the equation:

$$K = (1-Y)X_t$$

The linear ethylene/α-olefin copolymers used in the manufacture of the oriented film may be made from ethylene and the α-olefin by a process disclosed in Canadian Patent 856 137 which issued 1970 Nov. 7 to W. W. Baker, I. C. B. Saunders and J. M. Stewart. Other processes may also be used to produce the linear ethylene/α-olefin copolymer. The preferred copolymer is ethylene/octene-1 copolymer. The second polymer, if linear, may also be manufactured using the same process. The second polymer may be made by any of the known processes for making the appropriate ethylene polymer. For example, ethylene homopolymer may be made by high pressure or low pressure processes and may be a linear polymer or otherwise.

The oriented film may be made by known machine direction orientation processes, in which the film is stretched in the machine direction at a temperature below the melting temperature of the film. The oriented film may first be made using the so-called blown film process, and then machine direction orienting the film directly thereafter or in a separate step. A blown film process is disclosed in Canadian Patent 460 963 which issued 1949 Nov. 8 to E. D. Fuller. In other blown film processes, the film may be made using an internal or external cooling mandrel as disclosed, for example, in Canadian Patent 893 216 which issued 1972 Feb. 15 to M. Bunga and C. V. Thomas. The blown film process, by itself, is insufficient to impart the required degree of machine direction orientation, and further stretching, at a temperature below the melting temperature of the film is required.

The machine direction orientation may be accomplished by stretching an essentially unoriented ethylene/$C_4$–$C_{10}$ α-olefin film between first and second pairs of orientation rolls. Preferably the ratio of the peripheral speed of the second of such rolls to that of the first of such rolls, sometimes referred to as the draw ratio, is from about 1.5 to about 6.5, especially from about 4.0 to 5.0. Although it is not essential, it is preferred that each orientation roll have a nip roll associated therewith, said nip rolls applying substantially uniform force across the width of such nip rolls onto the associated orientation roll. It is also preferred that the distance between the nip rolls be as small as possible.

For example, a distance between nip rolls of from 100 to 2050 μm is preferred, and especially from 500 to 1500 μm. It is further preferred that the temperature of the orientation rolls be held at from 50° to 90° C. The optimum orientation temperature depends in part upon the density of the film being oriented. For example it is preferred to orient an ethylene/octene-1 film having a density of 0.920 g/cm$^3$ at about 60° C., whereas it is preferred to orient a similar film having a density of 0.930 g/cm$^3$ at 85° C. It is preferred that the nip rolls be placed as close to the minimum gap between the first and second orientation rolls as the diameters of the orientation and nip rolls will allow. Annealing of the film is desirable but not necessary.

The sealant film may be any thermoplastic polymeric film which can be heat sealed to itself and has an Elmendorf tear in the machine direction of at least about 2 g/μm. Preferably the Elmendorf tear in the machine direction is at least 8 g.μ. Typical sealant films are polyethylene films, ethylene/vinyl acetate copolymer films, ethylene/acrylic acid copolymer films, ethylene/methacrylic acid copolymer films and films of blends of polyethylene and such copolymers. A preferred sealant film is a blown film made from a polyethylene resin selected from a linear copolymer of ethylene and a $C_6$-$C_{10}$ α-olefin, having a density of from 0.916 to 0.924 g/cm$^3$ and blends of said copolymer with up to about 70 wt. % of another ethylene polymer, i.e. a homopolymer or copolymer, having a density of from 0.915 to 0.925 g/cm$^3$. For example the sealant film may be formed from 97 to 88 wt. % ethylene/octene-1 copolymer blended with 3 to 12 wt. % ethylene/vinyl acetate.

The film composites useful in the present invention may be made by conventional techniques of adhesively laminating the sealant films to the first film. Examples of adhesives which may be used include urethane-based adhesives, for example ADCOTE 503H (trade mark) and LAMAL 408-40 (trade mark) urethane adhesives. Other adhesives include polyvinylidene chloride adhesives, e.g. SERFENE 2015 (trade mark). The laminating adhesive and the laminating process must be sufficient to bond the layers of the laminate together so that they do not delaminate during the tearing process. This level of bonding may be determined by simple experimentation.

In the event that packaging of materials in the film laminate requires the use of a film having flavour, aroma, oxygen barrier properties or the like, either of the films of the laminate, i.e. the oriented film or the sealant film, may be coated with a suitable coating. For example, the oriented film may have thereon an aluminium coating, an ethylene/vinyl alcohol copolymer coating, a polyvinylidene chloride coating or the like. Such coatings may be applied by known methods.

It will be understood by those skilled in the art that additives, e.g. UV stabilizers, anti-block agents, slip additives, may be added to the polymers from which the films are made.

Known vertical form and fill machines may be used for forming a tube from a web of the film laminate used in the present invention, for forming the so-called back seam or side seam, the transverse heat seals and for severing the pouch from the tube. Known sachet forming machines may also be used for forming a tube from two webs, at least one of which is the transversely tearable laminate of the present invention, for forming the two sideseams, the transverse seals and for severing the sachet from the webs.

Although there are a number of ways in which to provide the heat-sealed area and slit, one way is described in more detail herein for a vertical form and fill machine, sometimes with reference to the drawings.

Figure 1:
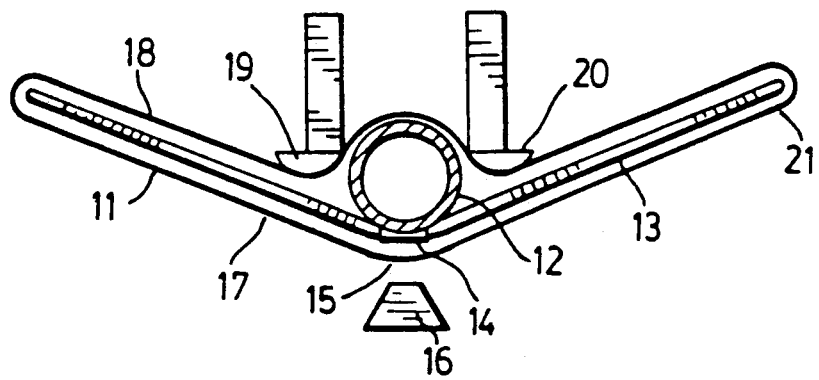
FIG. 1 shows a plan view of a filling tube and film diverter useful in the present invention.

In FIG. 1, a web of the transversely tearable film laminate (which may hereinafter be referred to as the "film") has been folded using a film-folding mechanism (not shown) such that longitudinal edges of the film 11 (not shown) overlap. The film 11, now in essentially tubular form, surrounds fill-tube 12 and tube-forming plate 13. Fill tube 12 may have a heat-seal backing plate 14 thereon for assisting in forming a heat-sealed back seam 15 with a vertical heat sealing jaw 16. It has been found that it is preferable to substantially equalize the lengths of the front wall 17 and back wall 18 of the film tube using film diverters 19 and 20, or similar.

Film diverters 19 and 20 may be made of metal and preferably have low-slip surfaces in contact with the film, e.g. have been coated with a non-stick finish.

Figure 2:
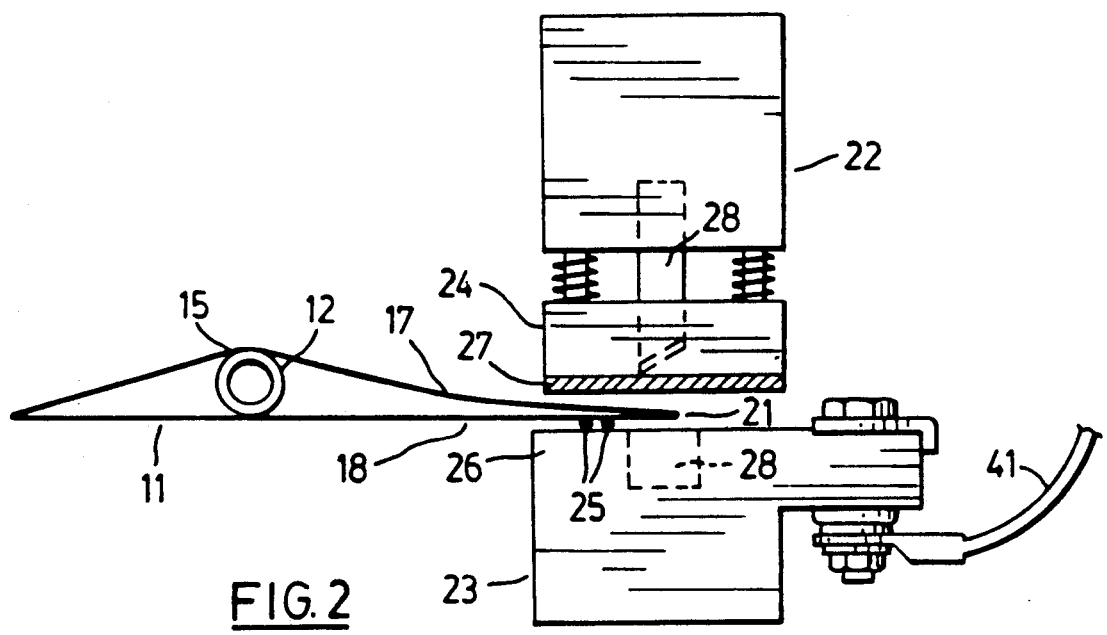
FIG. 2 shows a plan view of the compartment sealing device, exaggerated in size with respect to the fill tube and pouch shown therein.

Immediately after the film 11 passes the end of tube forming plate 13, the substantially flattened edge portion 21 of the tube passes between jaws 23 and 24 of compartment sealing device 22, as shown in FIG. 2. Jaw 23 comprises an electrical impulse sealer 25, mounted on a water-cooled block 26. A layer of polytetrafluoroethylene-coated glass fibre tape (not shown) separates the impulse sealer from the sealing jaw, as is known in the art. A pad of rubber or other flexible back-up material 27 is mounted on the face of jaw 24. The impulse sealer 25 and pad 27 may be prevented from sticking to the film by interposing layers of polytetrafluoroethylene-coated glass fibre tape. Located within jaw 24 is a knife blade 28 which is adapted to be moved from the position shown to a position in cavity 29 in jaw 23.

In operation, the flattened edge portion 21 on film 11 is passed between jaws 23 and 24. Jaws 23 and 24 are closed, pressing the front and back walls 17 and 18 of the film between the impulse sealer 25 and pad 27. Knife blade 28 is then thrust through the edge portion 21 of film to form a slit. An electrical impulse, fed through electrical connections (not shown), heats the impulse sealer 25 sufficiently to seal the inner layers of sealant film together. In a preferred embodiment the shape of the impulse sealer (not shown) is such that a seal is formed which surrounds the slit.

Figure 3:
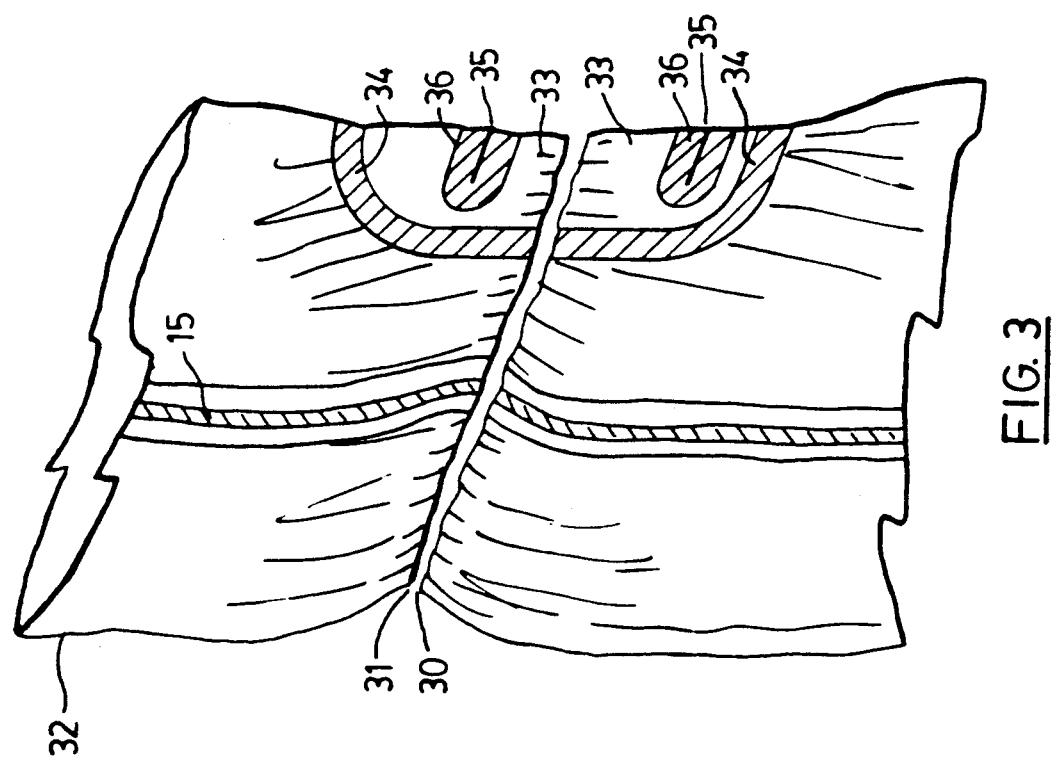
FIG. 3 shows the top of one pouch and the bottom of an adjacently-formed pouch, each with the heat-seal and slit feature.

The tubular film is then advanced, downwardly, past the lower end of fill tube 12 to a transverse impulse sealer. The transverse impulse sealer is constructed and operated as is known in the art and is used to heat seal and sever the tube transversely. After forming transverse seals 30, 31 as shown in FIG. 3, the upper tube 32 is filled with a known quantity of flowable material through fill tube 12. The flowable material is filled to a position in the tube which permits an air pocket (not shown) to be trapped in the upper part of the pouch. For many liquids, syrups and the like it is not necessary to leave an air pocket in the pouch, in which case the flowable material is kept flowing continuously. The small compartment 33 is formed by heat seal 34, using the apparatus described hereinabove (FIG. 2), or similar. The seal 34 is intended to separate the slit 35 from the contents of the pouch to maintain the contents within the pouch until required. The seal 36 surrounding the slit is intended to prevent ingress of material, e.g. water, food, bacteria, from entering and contaminating the interior of compartment 33.

The slit 35 may be replaced by at least one perforation. The slit is intended as a device for starting a tear and for directing the tear in a preferred direction. It has been found that with the film laminate of the present invention a tear, once initiated by pulling the film on either side of slit 35, travels transversely across the pouch. It has also been found that, invariably the tear stops at the back seam 15. This is advantageous in that the torn seal will not separate from the pouch. The torn portion may provide a convenient "handle" while pouring out the contents of the pouch and therefore may not be inadvertently dropped, or lost. This is an important feature for health reasons, and customer satisfaction.

The term "flowable material" does not include gases but encompasses materials which are flowable under gravity or may be pumped. Such materials include emulsions, e.g. ice cream mix; soft margarine; food dressings; pastes, e.g. meat pastes; peanut butter; preserves, e.g. jams, pie fillings, marmalade; jellies; dough; ground meat, e.g. sausage meat; powders, e.g. gelatin powders; detergents; liquids, e.g. milk; oils; and granular solids, e.g. rice, sugar.

The present invention may be illustrated by reference to the following examples:

EXAMPLE 1

Several oriented films were prepared from a blend of a) 85 wt. % linear ethylene/octene-1 copolymer having a density of 0.919 g/cm$^3$ and a melt index of 0.75 and b) 15 wt. % of an ethylene/vinyl acetate copolymer having 12% vinyl acetate. The blend was first formed into film using a blown film process. Several samples of the film were subsequently machine direction oriented at different draw ratios. Elmendorf tear strengths were measured, in the machine and transverse directions, using ASTM Procedure D 1922, and Y was calculated therefrom for each sample of film.

Samples of sealant film were prepared from a blend of 85 wt. % ethylene/octene-1 copolymer and 15 wt. % ethylene/vinyl acetate copolymer having a vinyl acetate content of 12%. The sea)ant film had a density of 0.920 g/cm$^3$. The composition was formed into films, 51 μm, 76 μm and 102 μm in thickness, using a blown film process.

Figure 4:
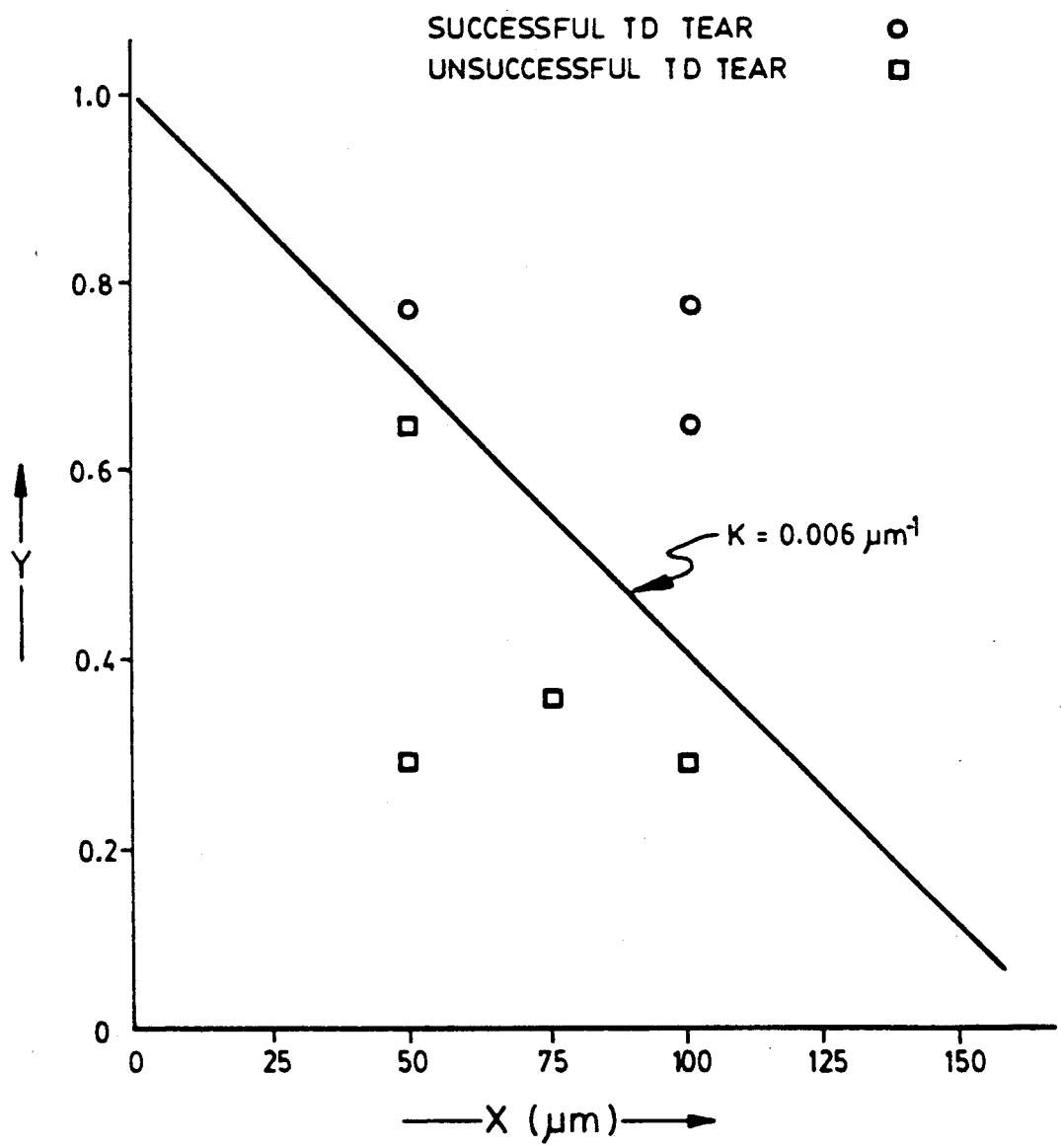
FIG. 4 shows a graph of Y and X from which K may be determined.

The oriented films were adhesively laminated to one or two layers of the sealant films, using SERFENE 2015 polyvinylidene chloride adhesive applied at a coating weight of 6.4 g/m$^2$. Peel strengths of the resulting laminates were measured using ASTM Procedure D 1876 and were all greater than 120 g/cm. The film laminates were then nicked at one of the edges and the laminates were then torn, starting at the nick. Note was taken as to whether the resulting tear was in the transverse direction, the machine direction or not well directed. The results were plotted on a graph which showed Y values for the oriented film against X values for the sealant layers. The results are shown in FIG. 4. From this data, K was estimated to be 0.006 μm$^{-1}$. The line, K.X=(1-Y) divides the successes from the failures.

EXAMPLE 2

A first film was prepared from a blend of a) 85 wt. % linear ethylene/octene-1 copolymer having a density of 0.919 g/cm$^3$ and a melt index of 0.75 and b) 15 wt. % ethylene homopolymer having a density of 0.918 g/cm$^3$ and a melt index of 7.0 available under the trade mark C-I-L 472. The blend was first formed into film using a blown film process. The film was subsequently machine direction oriented at a draw ratio of 6:1, resulting in a film having a thickness of 28 μm. The temperature of the first orientation roll was held at 90° C. and that of the second orientation roll was held at 90° C. The melting temperature of the first film was 120° C. Elmendorf tear strengths were measured, in the machine and transverse directions, using ASTM Procedure D 1922. Percent elongation at break was measured, in the machine direction, using ASTM Procedure D 638.

TABLE 1

| Property | Machine Direction | Transverse Direction |
|---|---|---|
| Elmendorf Tear g | 358 | 560 |
| % Elongation to break | 25% | 920% |

A sealant film was prepared from a blend of 85 wt. % ethylene/octene-1 copolymer and 15 wt. % ethylene/vinyl acetate copolymer having a vinyl acetate content of 12% The sealant film had a density of 0.920 g/cm$^3$. The composition was formed into film, 51 μm in thickness, using a blown film process. Elmendorf tear strengths were measured, in the machine and transverse directions, using ASTM Procedure D 1922. The results are shown in Table 2.

TABLE 2

| Property | Machine Direction | Transverse Direction |
|---|---|---|
| Elmendorf Tear g | 435 | 992 |

The first film was adhesively laminated to the sealant film, using LAMAL 408-40 urethane adhesive applied at a coating weight of 2.4 g/m$^2$. The peel strength of the resulting laminate was measured using ASTM Procedure D 1876. Elmendorf tear strength was measured in the machine and transverse directions. The results are shown in Table 3.

The first film was adhesively laminated to two sealant films such that the first film was sandwiched therebetween, using LAMAL 408-40 urethane adhesive applied at a coating weight of 2.4 g/m$^2$ at each interface. The peel strength of the resulting laminate was measured using ASTM Procedure D 1876. Elmendorf tear strength was measured in the machine and transverse directions. The results are shown in Table 4.

TABLE 3

| Property | Machine Direction | Transverse Direction |
|---|---|---|
| Elmendorf Tear g | 500 | 640 |
| Peel strength g/cm | >700 | |

TABLE 4

| Property | Machine Direction | Transverse Direction |
|---|---|---|
| Elmendorf Tear g | 1600 | 843 |
| Peel strength g/cm | >700 for each | |

TABLE 4-continued

| Property | Machine Direction | Transverse Direction |
|---|---|---|
| | layer | |

The two-ply laminate ((1-Y)=0.361; X=51) did not have the desirable transverse tear property and does not fall within the scope of the present application, whereas the three-ply laminate ((1-Y)=0.361; X=102) is a transversely tearable laminate within the scope of the present invention. The constant K was determined empirically to be 0.006 $\mu m^{-1}$ for the laminates in this example.

EXAMPLE 3

A first film was prepared from a blend of a) 85 wt. % linear ethylene/octene-1 copolymer having a density of 0.919 g/cm$^3$ and a melt index of 0.75 and b) 15 wt. % of an ethylene/vinyl acetate copolymer having 12% vinyl acetate. The blend was first formed into film using a blown film process. The film was subsequently machine direction oriented at a draw ratio of 4.92:1, resulting in a film having a thickness of 17 $\mu m$. The temperature of the first orientation roll was held at 65° C. and that of the second orientation roll was held at 65° C. The melting temperature of the first film was 120° C. The orientation gap was 1270 $\mu m$ and the film was annealed at 85°-90° C. after orientation. Elmendorf tear strengths were measured, in the machine and transverse directions, using ASTM Procedure D 1922. Percent elongation at break was measured, in the machine direction, using ASTM Procedure D 638. The results were as shown in Table 5.

TABLE 5

| Property | Machine Direction | Transverse Direction |
|---|---|---|
| Elmendorf Tear g | 309 | 406 |
| % Elongation to break | 44% | 770% |

A sealant film was prepared from a blend of 85 wt. % ethylene/octene-1 copolymer and 15 wt. % ethylene/vinyl acetate copolymer having a vinyl acetate content of 12%. The sealant film had a density of 0.920 g/cm$^3$. The composition was formed into film, 51 $\mu m$ in thickness, using a blown film process.

The first film was adhesively laminated to the sealant film, using SERFENE 2015 polyvinylidene chloride adhesive applied at a coating weight of 6.4 g/m$^2$. The peel strength of the resulting laminate was measured using ASTM Procedure D 1876. Elmendorf tear strength was measured in the machine and transverse directions. The results are shown in Table 6.

The first film was adhesively laminated to two sealant films such that the first film was sandwiched therebetween, using SERFENE 2015 polyvinylidene chloride adhesive applied at a coating weight of 6.4 g/m$^2$. The peel strength of the resulting laminate was measured using ASTM Procedure D 1876. Elmendorf tear strength was measured in the machine and transverse directions. The results are shown in Table 7.

TABLE 6

| Property | Machine Direction | Transverse Direction |
|---|---|---|
| Elmendorf Tear g | 353 | 339 |
| Peel strength g/cm | 155 | |

TABLE 7

| Property | Machine Direction | Transverse Direction |
|---|---|---|
| Elmendorf Tear g | 481 | 254 |
| Peel strength g/cm | 155 for one bond and 135 for the other | |

Both the two-ply and the three-ply laminates ((1-Y)=0.24; X=51 and 102 respectively) were easily transversely tearable and fall within the scope of the present invention. The constant K was determined empirically to be 0.006 $\mu m^{-1}$ for all of the laminates in this example.

We claim:

1. A transversely tearable laminate comprising a linear low density polyethylene film, oriented in the machine direction below its melting temperature, a substantially unoriented sealant film laminated onto at least one side of said oriented film, the sealant film having an Elmendorf tear in the machine direction of at least about 2 g/$\mu m$, and the selection of said oriented film and said sealant film being made on the basis that:

$$[K.X>(1Y)]KX>(1-Y),$$

wherein

K is a factor defined as $(1-Y)/X_r$ and empirically determined so as to make the above expression true for laminates which will tear more easily and consistently in the transverse direction than in the machine direction and false for other lamination, said factor depending on the properties of the oriented film and the sealant film, X is the thickness of all layers of sealant film in micrometers, $X_r$ is the thickness of all layers of sealant film in micrometers at which there is a change in the tearing property of the laminate from the machine direction to the transverse direction, $Y = (MD_c)/(TD_c)$, $MD_c$ is the Elmendorf tear strength, in the machine direction, of the oriented film, measured in grams, and $TD_c$ is the Elmendorf tear strength, in the transverse direction, of the oriented film, measured in grams.

2. A laminate according to claim 1 wherein the machine direction oriented linear low density polyethylene film is made from a polymer selected from the group consisting of at least one ethylene/C$_4$-C$_{10}$ $\alpha$-olefin copolymer having a density of from 0.900 to 0.040 g/cm$^3$ and blends of such copolymer with a second polymer, selected from a homopolymer of ethylene and a copolymer of ethylene and vinyl acetate, said second polymer having a density of from 0.910 to 0.940 g/cm$^3$, said blend having up to 70 wt. % of said second polymer.

3. A laminate according to claim 1 wherein the machine direction oriented linear low density polyethylene film is an ethylene/C$_6$-C$_8$ $\alpha$-olefin copolymer film.

4. A laminate according to claim 3 wherein the machine direction oriented linear low density polyethylene film is an ethylene/1-octene copolymer film.

5. A laminate according to claim 1 wherein the oriented linear low density polyethylene film has a density of from 0.916 to 0.924 g/cm$^3$.

6. A laminate according to claim 1 wherein the oriented linear low density polyethylene film has been oriented in the machine direction at a draw ratio of from 1.5 to 6.5.

7. A laminate according to claim 1, wherein the sealant film is made from a polyethylene resin selected from a linear copolymer of ethylene and a $C_4$–$C_{10}$ α-olefin, having a density of from 0.916 to 0.924 g/cm$^3$ and blends of said copolymer with up to about 70 wt. % of an ethylene homopolymer or copolymer having a density of from 0.915 to 0.925 g/cm$^3$.

8. A laminate according to claim 1 wherein at least one of the films in the laminate is metallized or coated with a barrier coating.

9. A laminate according to claim 7 wherein the barrier coating is selected from polyvinylidene chloride and ethylene/vinyl alcohol copolymer coatings.

* * * * *

UNITED STATES PATENT AND TRADEMARK OFFICE
CERTIFICATE OF CORRECTION

PATENT NO. : 5,091,241
DATED : February 25, 1992
INVENTOR(S) : Theodore John Lang
Kevin Bergevin It is certified that error appears in the above-identified patent and that said Letters Patent is hereby corrected as shown below: On the title page, Item [54] and in column 1, IN THE TITLE
  The title should read --FILM LAMINATE WITH EASY TD TEAR--
  Please replace "TO" with --TD--.

Column 12
  In Claim 1, line 26, please delete the part of the formula in brackets  "[K.X>(1Y)] --.

In Claim 1, line 32, please delete "lamination" and replace with --laminates--.

Column 14  line 6, claim should read --...according to claim 8...--. Please delete the "7" and insert --8--.

Signed and Sealed this

Twenty-ninth Day of June, 1993

Attest:

MICHAEL K. KIRK

Attesting Officer          Acting Commissioner of Patents and Trademarks